United States Patent
Martin et al.

(10) Patent No.: US 12,169,896 B2
(45) Date of Patent: Dec. 17, 2024

(54) GRAPHICS PRIMITIVES AND POSITIONS THROUGH MEMORY BUFFERS

(71) Applicant: Advanced Micro Devices, Inc., Santa Clara, CA (US)

(72) Inventors: Todd Martin, Orlando, FL (US); Tad Robert Litwiller, Orlando, FL (US); Nishank Pathak, Orlando, FL (US); Randy Wayne Ramsey, Orlando, FL (US); Michael J. Mantor, Orlando, FL (US); Christopher J. Brennan, Boxborough, MA (US); Mark M. Leather, Santa Clara, CA (US); Ryan James Cash, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/489,105

(22) Filed: Sep. 29, 2021

(65) Prior Publication Data

US 2023/0097097 A1    Mar. 30, 2023

(51) Int. Cl.
*G06T 15/80* (2011.01)
*G06T 1/20* (2006.01)
(Continued)

(52) U.S. Cl.
CPC ............... *G06T 15/80* (2013.01); *G06T 1/20* (2013.01); *G06T 1/60* (2013.01); *G06T 15/005* (2013.01)

(58) Field of Classification Search
CPC ........... G06T 1/20; G06T 1/60; G06T 15/005; G06T 15/80

(Continued)

(56) References Cited

U.S. PATENT DOCUMENTS

| | | | |
|---|---|---|---|
| 5,900,025 A | 5/1999 | Sollars | |
| 7,594,095 B1 * | 9/2009 | Nordquist | G06F 9/4843 |
| | | | 712/22 |

(Continued)

FOREIGN PATENT DOCUMENTS

GB    2597370 A    1/2022

OTHER PUBLICATIONS

Martin et al., U.S. Appl. No. 17/489,008, entitled "Load Multiple Primitives Per Thread in a Graphics Pipeline", filed Sep. 29, 2021, 31 pages.

(Continued)

*Primary Examiner* — Jacinta M Crawford
(74) *Attorney, Agent, or Firm* — Kowert, Hood, Munyon, Rankin & Goetzel, P.C.; Rory D. Rankin

(57) ABSTRACT

Systems, apparatuses, and methods for preemptively reserving buffer space for primitives and positions in a graphics pipeline are disclosed. A system includes a graphics pipeline frontend with any number of geometry engines coupled to corresponding shader engines. Each geometry engine launches shader wavefronts to execute on a corresponding shader engine. The geometry engine preemptively reserves buffer space for each wavefront prior to the wavefront being launched on the shader engine. When the shader engine executes a wavefront, the shader engine exports primitive and position data to the reserved buffer space. Multiple scan converters will consume the primitive and position data, with each scan converter consuming primitive and position data based on the screen coverage of the scan converter. After consuming the primitive and position data, the scan converters mark the buffer space as freed so that the geometry engine can then allocate the freed buffer space to subsequent shader wavefronts.

20 Claims, 14 Drawing Sheets

(51) Int. Cl.
*G06T 1/60* (2006.01)
*G06T 15/00* (2011.01)
(58) Field of Classification Search
USPC .................................................. 345/426, 530
See application file for complete search history.

(56) References Cited

U.S. PATENT DOCUMENTS

| | | | |
|---|---|---|---|
| 11,138,786 | B1 | 10/2021 | Uhrenholt |
| 2002/0073129 | A1 | 6/2002 | Wang et al. |
| 2003/0065809 | A1 | 4/2003 | Byron |
| 2006/0190943 | A1 | 8/2006 | Haeri |
| 2011/0302372 | A1 | 12/2011 | Fontenot et al. |
| 2012/0017062 | A1 | 1/2012 | Goel et al. |
| 2013/0021360 | A1* | 1/2013 | Gruber ............... G06F 9/52 |
| | | | 345/589 |
| 2013/0226535 | A1 | 8/2013 | Tuan |
| 2013/0332702 | A1 | 12/2013 | Boudier |
| 2014/0362102 | A1* | 12/2014 | Cerny ............... G06T 1/60 |
| | | | 345/589 |
| 2015/0200867 | A1 | 7/2015 | Dutta et al. |
| 2015/0208275 | A1 | 7/2015 | Kakadia et al. |
| 2015/0212794 | A1 | 7/2015 | Otenko |
| 2015/0235341 | A1* | 8/2015 | Mei ............... G06T 1/60 |
| | | | 345/426 |
| 2016/0055005 | A1 | 2/2016 | Hsu et al. |
| 2016/0371082 | A1 | 12/2016 | Yudanov et al. |
| 2017/0053374 | A1 | 2/2017 | Howes et al. |
| 2018/0046474 | A1 | 2/2018 | Wang et al. |
| 2018/0082399 | A1 | 3/2018 | Martin et al. |
| 2018/0129499 | A1 | 5/2018 | Østby |
| 2018/0165786 | A1 | 6/2018 | Bourd et al. |
| 2018/0211435 | A1 | 7/2018 | Nijasure et al. |
| 2018/0276046 | A1 | 9/2018 | Joao et al. |
| 2019/0102224 | A1 | 4/2019 | Bernat et al. |
| 2019/0108671 | A1 | 4/2019 | Rollingson et al. |
| 2019/0236749 | A1* | 8/2019 | Gould ............... G06T 1/20 |
| 2019/0258635 | A1 | 8/2019 | Pal et al. |
| 2019/0370059 | A1 | 12/2019 | Puthoor et al. |

OTHER PUBLICATIONS

Non-Final Office Action in U.S. Appl. No. 17/489,008, mailed Jan. 5, 2023, 13 pages.

* cited by examiner

GRAPHICS PRIMITIVES AND POSITIONS THROUGH MEMORY BUFFERS

BACKGROUND

Description of the Related Art

Three-dimensional (3-D) graphics are often processed using a graphics pipeline formed of a sequence of programmable shaders and fixed-function hardware blocks. For example, a 3-D model of an object that is visible in a frame can be represented by a set of triangles, other polygons, or patches which are processed in the graphics pipeline to produce values of pixels to be displayed to a user. The triangles, other polygons, and patches are collectively referred to as primitives.

In a typical graphics pipeline, a sequence of work-items, which can also be referred to as threads, are processed so as to output a final result. Each processing element executes a respective instantiation of a particular work-item to process incoming data. A work-item is one of a collection of parallel executions of a kernel invoked on a compute unit. A work-item is distinguished from other executions within the collection by a global ID and a local ID. As used herein, the term "compute unit" is defined as a collection of processing elements (e.g., single-instruction, multiple-data (SIMD) units) that perform synchronous execution of a plurality of work-items. The number of processing elements per compute unit can vary from implementation to implementation. A subset of work-items in a workgroup that execute simultaneously together on a compute unit can be referred to as a wavefront, warp, or vector. The width of a wavefront is a characteristic of the hardware of the compute unit.

Graphics processing pipelines include a number of stages that perform individual tasks, such as transforming vertex positions and attributes, calculating pixel colors, and so on. Many of these tasks are performed in parallel by the collection of processing elements on the individual work items of wavefronts traversing the pipeline. Graphics processing pipelines are continually being updated and improved.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for preemptively reserving buffer space for primitives and positions in a graphics pipeline are disclosed herein. In one implementation, a system includes a graphics pipeline frontend with a geometry engine and one or more shader processor inputs (SPIs) coupled to a plurality of compute units. The geometry engine generates vertices and primitives which are accumulated into primitive groups. During this process, the geometry engine tracks the number of vertices and primitives per primitive group. The geometry engine calculates how much buffer space will be needed by a primitive shader to export vertex and primitive data for the wavefronts of the primitive group. The geometry engine preemptively reserves buffer space for each wavefront prior to the wavefronts being launched on the compute units.

In one implementation, for a given wavefront, the SPI waits until the buffer space is reserved for the vertex and primitive data of the given wavefront prior to launching the given wavefront on a compute unit. When the compute unit executes the given wavefront, the compute unit exports the vertex and primitive data to a first portion of the reserved buffer space. Primitive assembler(s) process the exported vertex and primitive data to generate non-culled primitive data which is stored in a second portion of the reserved buffer space. Scan converter(s) will consume the non-culled primitive data and then mark the buffer space as freed after consuming the non-culled primitive data. This allows the geometry engine to reuse the freed buffer space for subsequent wavefronts. By reserving buffer space multiple pipeline stages early, the buffer space will be available when needed and wavefronts can proceed without being stalled due to lack of buffer space. This helps improve throughput of wavefront execution.

Figure 1:
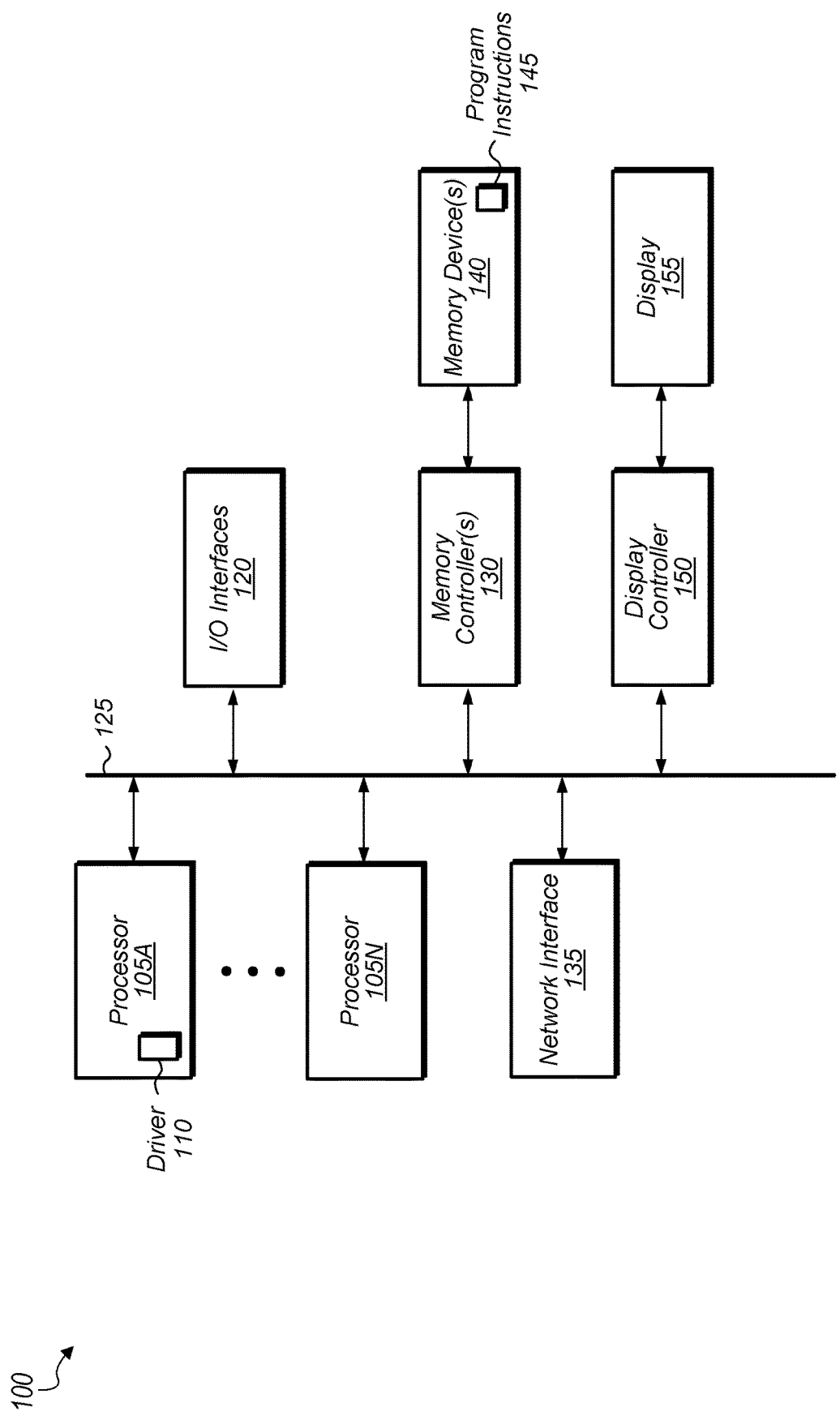
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105A executes a driver 110 (e.g., graphics driver) for communicating with and/or controlling the operation of one or more of the other processors in system 100. In one implementation, processor 105N is a data parallel processor with a highly parallel architecture, such as a graphics processing unit (GPU) which processes data, executes parallel processing workloads, renders pixels for display controller 150 to drive to display 155, and/or executes other workloads.

GPUs can execute graphics-processing tasks required by an end-user application, such as a video-game application. GPUs are also increasingly being used to perform other tasks which are unrelated to graphics. Other data parallel processors that can be included in system 100 include digital signal processors (DSPs), field programmable gate arrays (FPGAs), application specific integrated circuits (ASICs), and so forth. In some implementations, processors 105A-N include multiple data parallel processors.

In some implementations, an application executing on processor 105A utilizes a graphics application programming interface (API) to invoke a user mode driver 110 (or a similar GPU driver). In one implementation, user mode driver 110 issues one or more commands to a GPU for rendering one or more graphics primitives into displayable graphics images. Based on the graphics instructions issued by the application to the user mode driver 110, the user mode driver 110 formulates one or more graphics commands that specify one or more operations for the GPU to perform for rendering graphics. In some implementations, the user mode driver 110 is a part of an application running on a CPU. For example, the user mode driver 110 may be part of a gaming application running on the CPU. In one implementation, when driver 110 is a kernel mode driver, driver 110 is part of an operating system (OS) running on the CPU.

Memory controller(s) 130 are representative of any number and type of memory controllers accessible by processors 105A-N. While memory controller(s) 130 are shown as being separate from processors 105A-N, it should be understood that this merely represents one possible implementation. In other implementations, a memory controller 130 can be embedded within one or more of processors 105A-N. Memory controller(s) 130 are coupled to any number and type of memory devices(s) 140.

Memory device(s) 140 are representative of any number and type of devices containing memory and/or storage elements. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others. Memory device(s) 140 store program instructions 145, which can include a first set of program instructions for an application, a second set of program instructions for an driver component, and so on. Alternatively, program instructions 145, or a portion thereof, can be stored in a memory or cache device local to processor 105A and/or processor 105N.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, and so forth. Network interface 135 is able to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
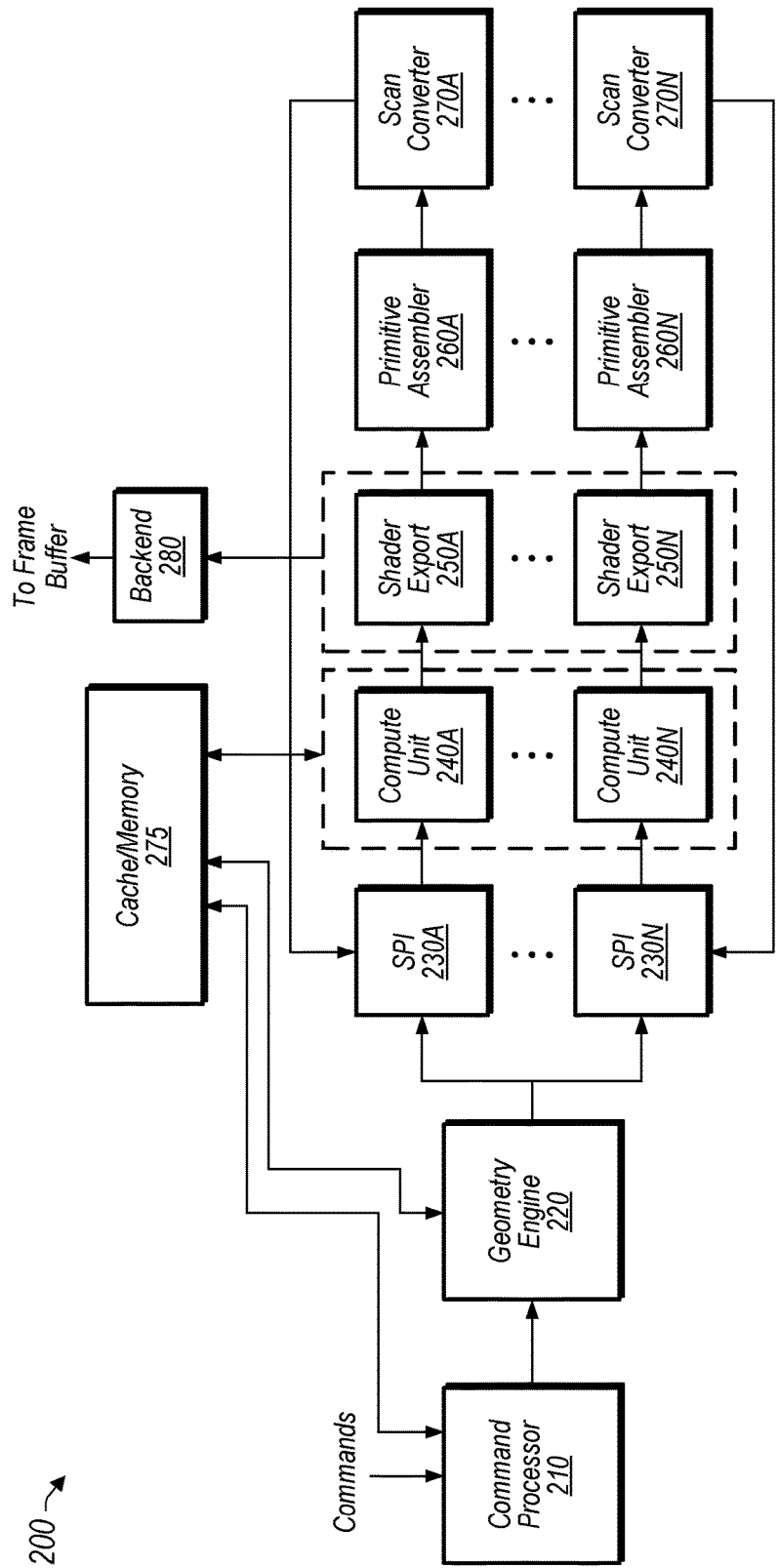
FIG. 2 is a block diagram of one implementation of a GPU.

Turning now to FIG. 2, a block diagram of one implementation of a GPU 200 is shown. In one implementation, command processor 210 processes commands received from a host processor (e.g., processor 105A of FIG. 1). Also, command processor 210 sets GPU 200 in the correct state to execute the received commands. In various implementations, the received commands are intended to cause GPU 200 to render various scenes of a video game application, movie, or other application. Based on commands received from command processor 210, geometry engine 220 processes indices according to the topology (e.g., points, lines, triangles) and connectivity of the scene being rendered. For example, in one implementation, geometry engine 220 processes a mesh based on quadrilateral primitives or triangle primitives that represent a three-dimensional (3D) object. In this example, geometry engine 220 reads vertices out of a buffer (stored in cache/memory 275) using fixed function operations, forming mesh geometry, and creating pipeline work items. Each mesh processed by geometry engine 220 can have a different ratio of primitives to vertices depending on the density/complexity of the mesh, vertex reuse, and so on.

Geometry engine 220 is coupled to any number of shader processor inputs (SPIs) 230A-N, with the number varying according to the implementation. SPIs 230A-N accumulate work items until enough work items have been received to generate a wavefront, and then SPIs 230A-N launch the wavefronts on compute units 240A-N, respectively. Depending on the implementation, a wavefront can include 32 work items, 64 work items, or some other number of work items. It is noted that the terms "work item" and "thread" can be used interchangeably herein.

Compute units 240A-N execute shader programs to process the wavefronts received from SPIs 230A-N. In one implementation, a geometry front-end includes a vertex shader and a hull shader that operate on high order primitives such as patches that represent a three-dimensional (3D) model of a scene. In this implementation, the geometry front-end provides the high order primitives to a shader which generates lower order primitives from the higher order primitives. The lower order primitives are then replicated, shaded, and/or sub-divided before being processed by pixel engines. The pixel engines perform culling, rasterization, depth testing, color blending, and the like on the primitives to generate fragments or pixels for display. In other implementations, other types and/or sequences of shaders are employed to process the various wavefronts traversing the pipeline.

Compute units 240A-N read from and write to cache/memory 275 during execution of the shader programs. Shader export units 250A-N manage the outputs from the compute units 240A-N and forward the outputs either to the primitive assemblers 260A-N or the backend 280. For example, in one implementation, shader export units 250A-N export the positions of vertices after transformation. Primitive assemblers 260A-N accumulate and connect vertices that span primitives and pass the primitives to scan converters 270A-N which perform rasterization. Primitive assemblers 260A-N also perform culling for primitives that will not be visible. Scan converters 270A-N determine which pixels are covered by the primitives and forward the pixel data to SPIs 230A-N which will then launch pixel shader wavefronts on compute units 240A-N.

Figure 3:
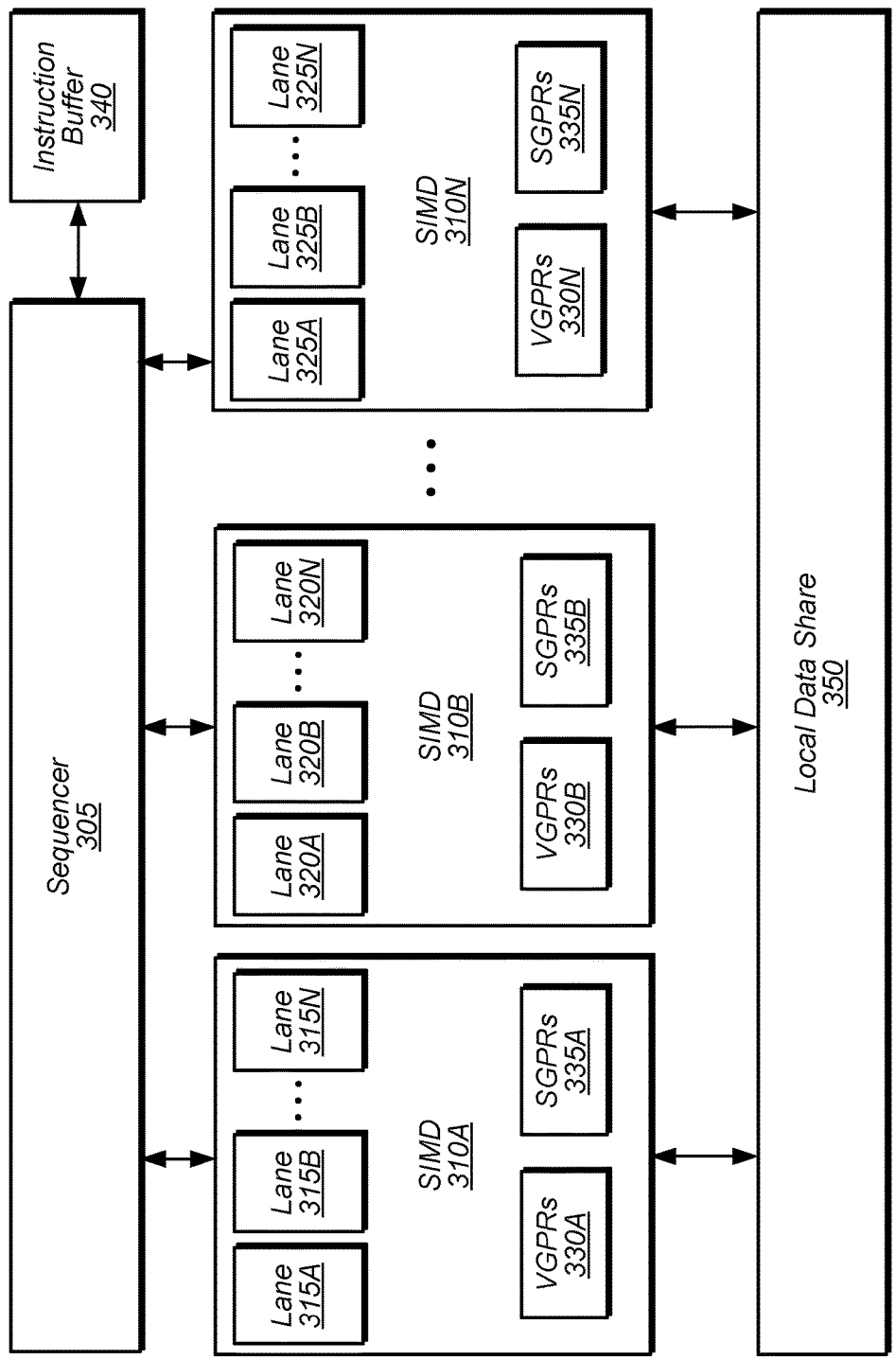
FIG. 3 is a block diagram of one implementation of a compute unit.

Referring now to FIG. 3, a block diagram of one implementation of a compute unit 300 is shown. In one implementation, compute unit 300 includes at least SIMDs 310A-N, sequencer 305, instruction buffer 340, and local data share (LDS) 350. It is noted that compute unit 300 can also include other components which are not shown in FIG. 3 to avoid obscuring the figure. In one implementation, compute units 240A-N (of FIG. 2) include the components of compute unit 300.

In one implementation, compute unit 300 executes instructions of a kernel on any number of wavefronts. These instructions are stored in instruction buffer 340 and scheduled for execution on SIMDs 310A-N by sequencer 305. In one implementation, the width of a wavefront matches a number of lanes in lanes 315A-N, 320A-N, and 325A-N in SIMDs 310A-N. Each lane 315A-N, 320A-N, and 325A-N of SIMDs 310A-N can also be referred to as an "execution unit" or a "processing element".

In one implementation, GPU 300 receives a plurality of instructions for a wavefront with a number of work-items. When work-items execute on SIMDs 310A-N, each work-item is assigned a corresponding portion of vector general purpose registers (VGPRs) 330A-N, scalar general purpose registers (SGPRs) 335A-N, and local data share (LDS) 350. It is noted that the letter "N" when displayed herein next to various structures is meant to generically indicate any number of elements for that structure (e.g., any number of SIMDs 310A-N). Additionally, different references within FIG. 3 that use the letter "N" (e.g., SIMDs 310A-N and lanes 315A-N) are not intended to indicate that equal numbers of the different elements are provided (e.g., the number of SIMDs 310A-N can differ from the number of lanes 315A-N).

Figure 4:
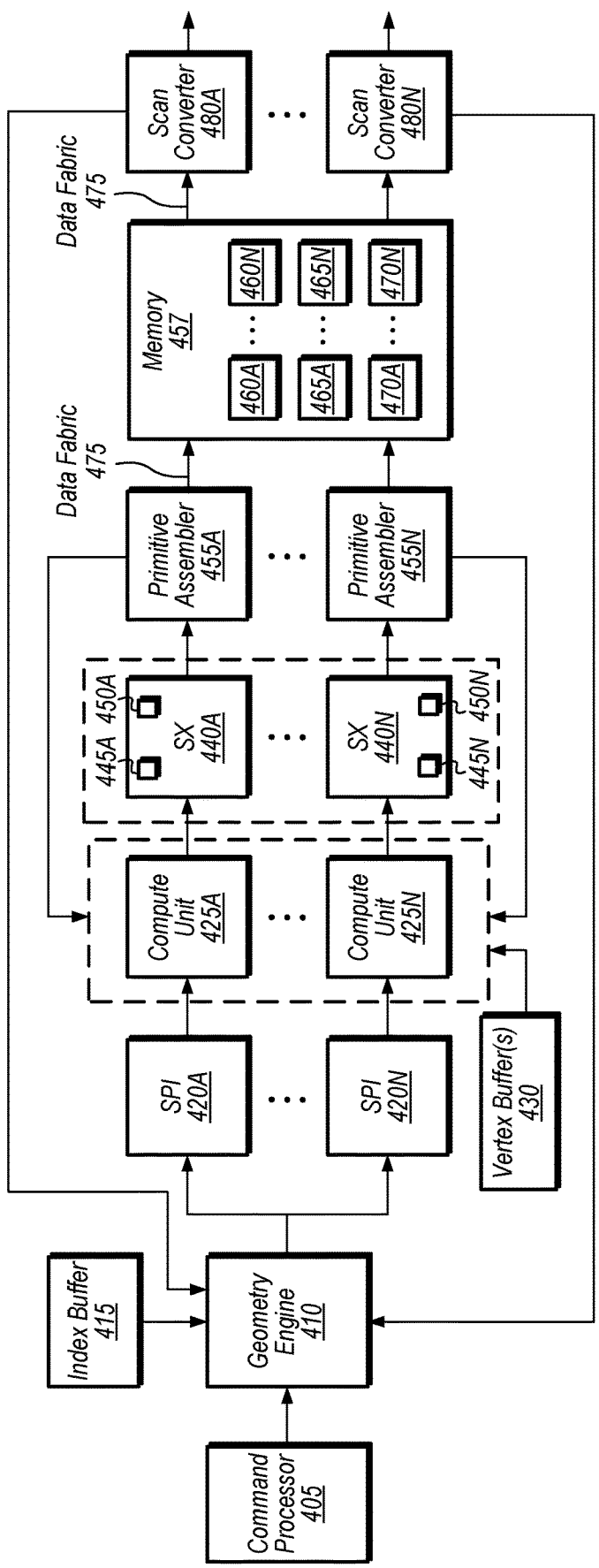
FIG. 4 is a block diagram of one implementation of a graphics pipeline.

Turning now to FIG. 4, a block diagram of one implementation of a graphics pipeline 400 is shown. In one implementation, graphics pipeline 400 includes command processor (CP) 405 which sends draw and direct memory access (DMA) commands to geometry engine 410. As part of processing the draw and DMA commands, geometry engine 410 retrieves corresponding data from index buffer 415. In one implementation, geometry engine 410 generates vertices and primitives which are accumulated into primitive groups. Geometry engine 410 tracks the numbers of vertices and primitives in the primitive groups, and geometry engine 410 forwards the primitive groups to shader processor inputs (SPIs) 420A-N, which are representative of any number of SPIs. Depending on the implementation, there can be from 1 to N SPIs, where N is a positive integer. Geometry engine 410 is also coupled to scan converters 480A-N to receive indications of freed buffer space after scan converters 480A-N have consumed entries in buffers 460A-N, 465A-N, and 470A-N for various wavefronts. It is noted that the components shown in graphics pipeline 400 are merely intended to represent one possible implementation. Other implementations can include other arrangements of components. Additionally, it is noted that graphics pipeline 400 can include other components and connections which are not shown to avoid obscuring the figure.

SPIs 420-N generate wavefronts from the primitive groups and launch the wavefronts to compute units 425A-N. The compute units 425A-N can execute any number of instructions to perform various different types of operations on the vertices and primitives of the wavefronts. For example, per-vertex operations performed on the vertices of vertex buffer 430 include, but are not limited to, transformations, skinning, morphing, per-vertex lighting, modeling transformations, viewing transformations, projection transformations, perspective division, viewport transformations, attribute modifications, and others. Also, per-primitive operations which include, but are not limited to, point sprite expansion, dynamic particle system operations, fur-fin generation, shadow volume generation, single pass render-to-cubemap, per-primitive material swapping, per-primitive material setup, and others.

Prior to the wavefronts being launched on compute units 425A-N, geometry engine 410 reserves buffer space in buffers 445A-N and buffers 450A-N in shader export (SX) units 440A-N and in buffers 460A-N, 465A-N, and 470A-N in memory 457 for the corresponding primitive groups. This ensures that the compute units 425A-N executing the shader wavefronts and primitive assemblers 455A-N processing the outputs of the shader wavefronts will have buffer space to store the outputs generated by these wavefronts. This prevents the wavefronts from having to stall to wait for buffer space to become available. Buffers 445A-N, 450A-N, 460A-N, 465A-N, and 470A-N are representative of any number and type of buffers. In one implementation, buffers 445A-N, 450A-N, 460A-N, 465A-N, and 470A-N are ring buffers. In other implementations, buffers 445A-N, 450A-N, 460A-N, 465A-N, and 470A-N are implemented using other types of structures. In one implementation, buffers 445A-N are position buffers and buffers 450A-N are primitive buffers. However, in other implementations, buffers 445A-N and 450A-N can include other numbers and/or types of buffers. In one implementation, buffers 460A-N are position buffers, buffers 465A-N are parameter buffers, and buffers 470A-N are primitive buffers. In other implementations, buffers 460A-N, 465A-N, and 470A-N can be other types of buffers.

In one implementation, during wavefront execution, shaders executing on compute units 425A-N export data to the position and primitive buffers 445A-N and 450A-N, respectively, in shader export units 440A-N and to parameter buffers 465A-N in memory 457. The data in position buffers 445A-N and primitive buffers 450A-N goes to primitive assemblers 455A-N. The data in parameter buffers 465A-N includes attributes which are sent to SPIs 420A-N and provided to pixel shaders executing on a second pipeline pass. In one implementation, primitive assemblers 455A-N perform culling and/or various other tasks, and then the primitive assemblers 455A-N send the data for non-culled primitives downstream to the primitive buffers 470A-N and positions buffers 460A-N in memory 457 for consumption by scan converters 480A-N. In other words, post-culled data is stored in buffers 460A-N and 470A-N via data fabric 475 in this implementation, with data fabric 475 representing the data fabric used by memory transactions from other agents and engines in the system or apparatus. By using data fabric 475, distribution of position and primitive data to scan converters 480A-N is achieved without dedicated hard-wired connections. This allows for simpler scaling up of architectures when the number of primitive assemblers and/or scan converters in the system/apparatus increases.

The culling results from primitive assemblers 455A-N are also provided back to the shaders executing on compute units 425A-N. In one implementation, the culling results are conveyed using cull masks. In other implementations, the culling results are conveyed in other suitable manners to the shaders executing on compute units 425A-N. In one implementation, the outputs of scan converters 480A-N make a second pipeline pass through SPIs 420A-N for the pixel data. In this implementation, SPIs 420A-N provide outputs to pixel shaders executing on compute units 425A-N to perform the pixel shading for the post-culled primitive data.

Figure 5:
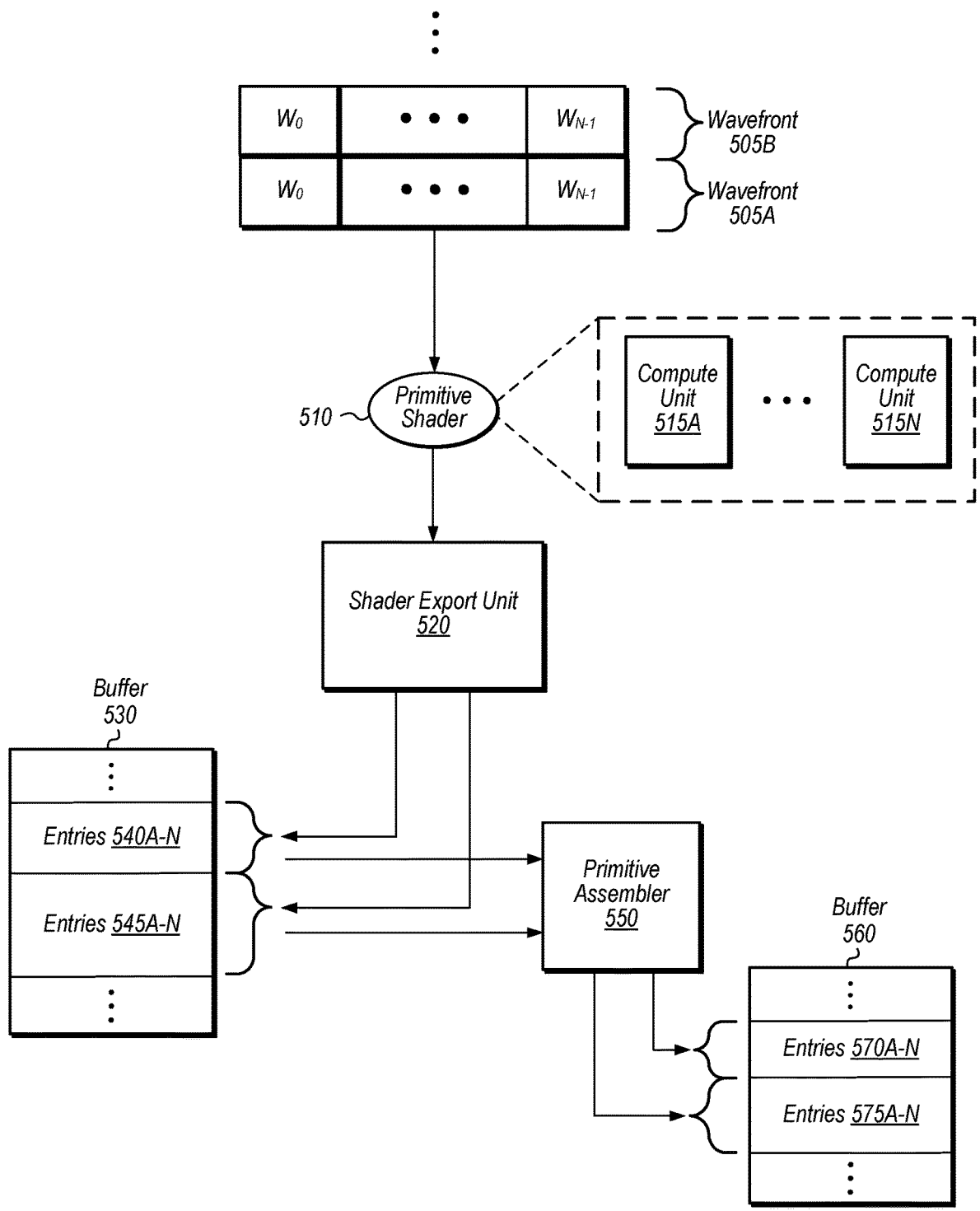
FIG. 5 is a block diagram of one implementation of primitive shader wavefronts populating buffer entries.

Referring now to FIG. 5, a block diagram of one implementation of primitive shader wavefronts populating buffer entries is shown. In one implementation, the wavefronts 505A-B are executed by primitive shader 510 on compute units 515A-N, and wavefronts 505A-B can be followed by any number of other wavefronts. In one implementation, a geometry engine (e.g., geometry engine 410 of FIG. 4) reserves buffer space in buffer 530 and buffer 560 for wavefronts 505A-B prior to wavefronts 505A-B being launched on compute units 515A-N. Buffers 530 and 560 are representative of any type and number of buffers (e.g., primitive buffer, position buffer, parameter buffer). In one implementation, buffer 530 is an on-chip buffer (i.e., internal to the host processor) while buffer 560 is an off-chip buffer (i.e., external to the host processor). It is noted that the geometry engine can also reserve buffer space for wavefronts 505A-B in one or more other buffers which are not shown to avoid obscuring the figure.

It is assumed for the purposes of this discussion that entries 540A-N of buffer 530 and entries 570A-N of buffer 560 are assigned to wavefront 505A and entries 545A-N of buffer 530 and entries 575A-N of buffer 560 are assigned to wavefront 505B. It is also assumed for the purposes of this discussion that wavefront 505A is older than wavefront 505B. However, while wavefront 505A is older than wavefront 505B in this example, it is possible for wavefront 505B to finish execution prior to wavefront 505A. In this case, shader export unit 520 is able to write the outputs of wavefront 505B to entries 545A-N without waiting for wavefront 505A to finish. By assigning wavefronts to specific buffer locations ahead of time, shader export unit 520 is able to store vertex and primitive data to buffer 530 for wavefronts executing out of order. Similarly, primitive assembler 550 is able to process the vertex and primitive data and write the corresponding outputs to buffer 560 in any order.

It is noted that the number of entries 540A-N of buffer 530 assigned to wavefront 505A can be different than the number of entries 545A-N of buffer 530 assigned to wavefront 505B. Similarly, the number of entries 570A-N of buffer 560 assigned to wavefront 505A can be different than the number of entries 575A-N of buffer 560 assigned to wavefront 505B. This can occur because the number of entries is based on the number of vertices and primitives of each wavefront, and the number of vertices and primitives can vary from wavefront to wavefront in at least one implementation. It is also noted that any number of other wavefronts can be assigned entries in buffer 530 and buffer 560 prior to these wavefronts being launched on compute units 515A-N.

Figure 6:
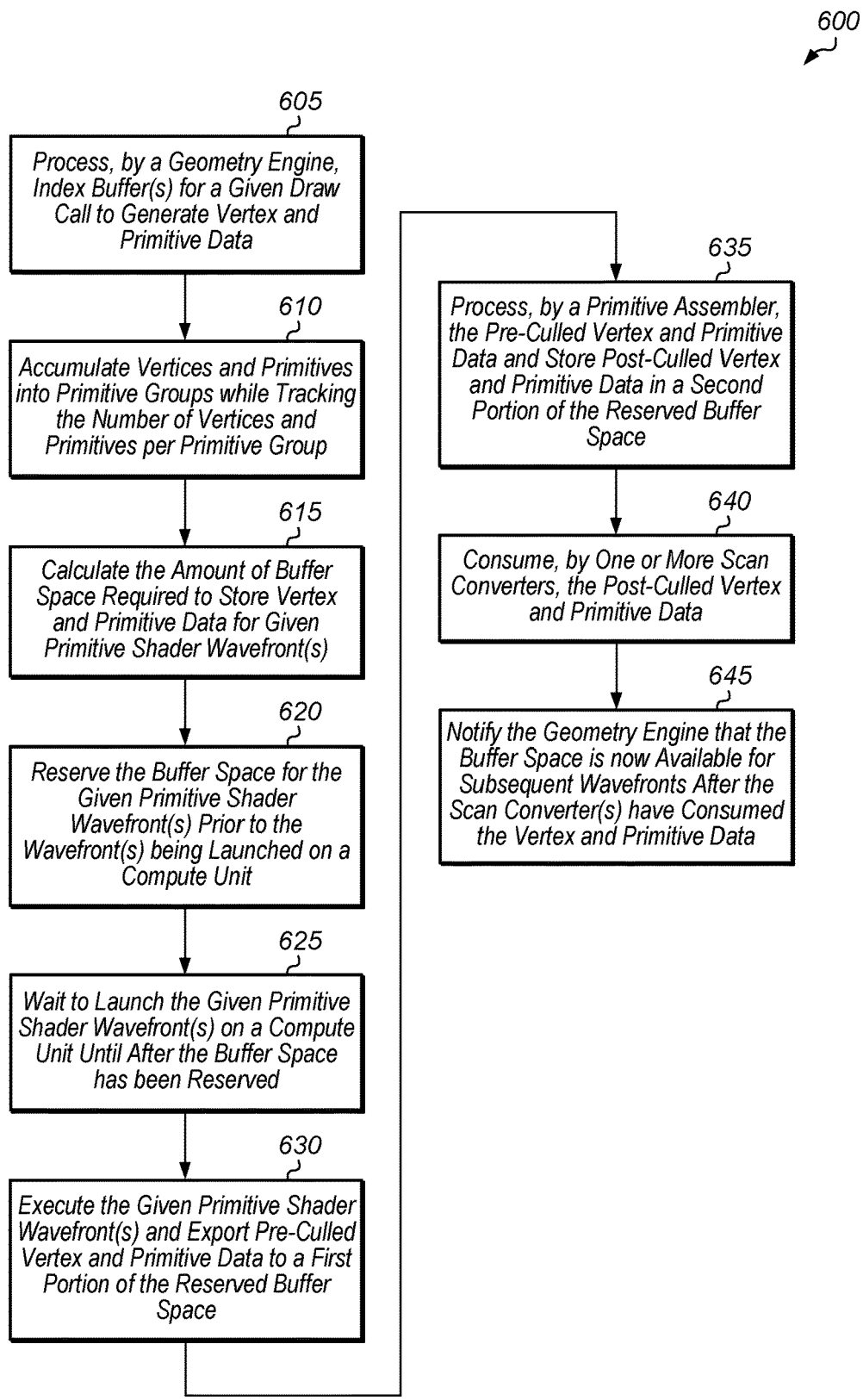
FIG. 6 is a generalized flow diagram illustrating one implementation of a method for reserving space for primitives and positions in memory buffers.
Figure 7:
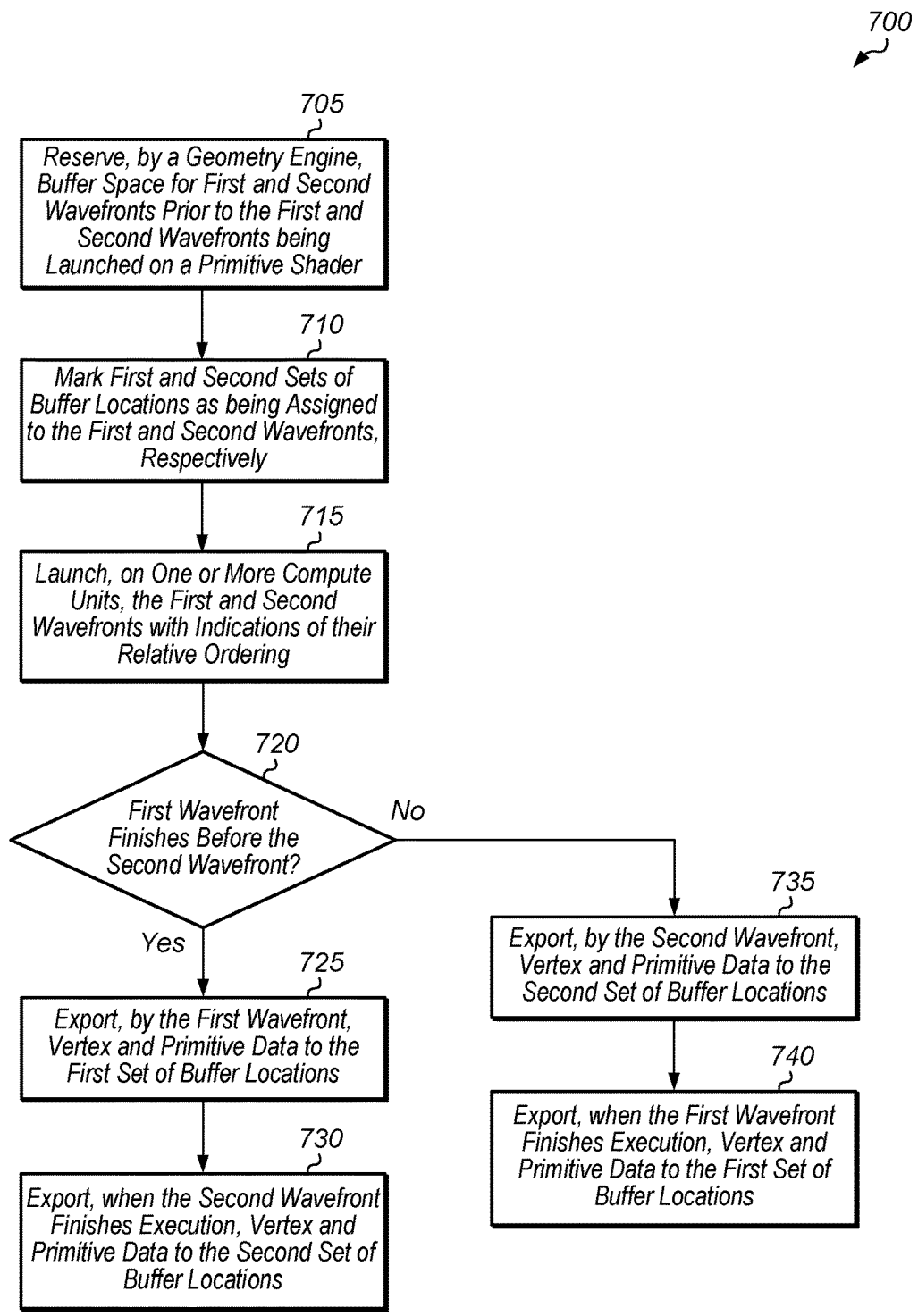
FIG. 7 is a generalized flow diagram illustrating one implementation of a method for reserving space for out of order execution of wavefronts by a primitive shader.

Turning now to FIG. 6, one implementation of a method 600 for reserving space for primitives and positions in memory buffers is shown. For purposes of discussion, the steps in this implementation and those of FIGS. 7-8, 10-12, and 14 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 600 (and methods 700-800, 1000-1200, and 1400).

A geometry engine processes index buffer(s) for a given draw call to generate vertex and primitive data (block 605). The geometry engine accumulates the vertices and primitives into primitive groups while tracking the number of vertices and primitives per primitive group (block 610). In an implementation with multiple geometry-shader engine pairs (e.g., geometry engine, primitive groups are sent to successive geometry-shader engine pairs to spread out the work. For given primitive shader wavefront(s), the geometry engine calculates the amount of buffer space required to store vertex and primitive data for a primitive shader executing the given primitive shader wavefront (block 615). For example, the geometry engine calculates that each vertex will need an entry in a position buffer and each primitive will need an entry in a primitive buffer to store corresponding connectivity information. Depending on the implementation, the geometry engine calculates the amount of buffer space for one wavefront or for a groups of wavefronts. The calculation and reservation can be made per sub-group or attribute group, with a sub-group including one or more wavefronts.

Next, the geometry engine reserves the buffer space for the given primitive shader wavefront(s) prior to the given primitive shader wavefront being launched on a compute unit (block 620). Meanwhile, a SPI waits to launch the given primitive shader wavefront(s) on a compute unit until after the buffer space has been reserved for the given wavefront(s) (block 625). By waiting to launch the given wavefront(s) until the space has been reserved for the given wavefront in the buffers, this ensures that the given wavefront(s) will not be stalled due to lack of buffer space for the data to be exported by the given wavefront(s).

The compute unit executes the given primitive shader wavefront(s) and exports pre-culled vertex and primitive data to a first portion of the reserved buffer space (block 630). Next, the pre-culled vertex and primitive data is processed by a primitive assembler and post-culled vertex and primitive data is stored in a second portion of the reserved buffer space (block 635). In one implementation, the geometry engine, compute unit, primitive assembler, and first portion of the reserved buffer space are on a first semiconductor die, and the second portion of the reserved buffer space is on a second semiconductor die different from the first semiconductor die. Then, the post-culled vertex and primitive data is consumed by one or more scan converters (block 640). In an implementation with multiple geometry-shader engine pairs, a given scan converter will receive vertex and primitive data for a corresponding screen tile from all of the geometry-shader engine pairs. After the scan converter(s) have consumed the vertex and primitive data, the geometry engine is notified that the buffer space is now available for subsequent wavefronts (block 645). After block 645, method 600 ends. It is noted that while method 600 is described in the context of primitive shader wavefronts, method 600 can also be performed for other types of shader waveforms in other implementations Referring now to FIG. 7, one implementation of a method 700 for reserving space for out of order execution of wavefronts by a primitive shader is shown. A geometry engine reserves space for a plurality of wavefronts, including a first and second wavefront, prior to being launched on a primitive shader (block 705). It is assumed for the purposes of this discussion that the first wavefront is older than the second wavefront. As part of reserving buffer space for the first and second wavefront, first and second sets of buffer locations are marked as being assigned to the first and second wavefronts, respectively (block 710). The first and second wavefronts are launched, on one or more compute units, with indications of their relative ordering (block 715). In other words, the first wavefront knows that it is earlier in the ordering sequence than the second wavefront. At this point, once the wavefronts have their output buffers allocated and have been launched, the wavefronts can execute fully out of order. This includes SPI reservation, launch to a compute unit, primitive and position export, culling, writing of primitive and position data to memory, culling feedback to shaders, final attribute calculation and storing, and generation of wavefront done notifications. Next, if the first wavefront finishes execution prior to the second wavefront (conditional block 720, "yes" leg), the first wavefront exports vertex and primitive data to the first set of buffer locations (block 725). For example, in one implementation, the vertex and primitive data of the first wavefront is written to the previously reserved first set of locations in position buffers, primitive buffers, and parameter buffers. In other implementations, the vertex and primitive data of the first wavefront is written to the previously reserved first locations in other types and/or numbers of buffers. After block 725, when the second wavefront finishes execution, the second wavefront exports vertex and primitive data to the second set of buffer locations (block 730). After block 730, method 700 ends.

Otherwise, if the second wavefront finishes execution prior to the first wavefront (conditional block 720, "no" leg), the second wavefront exports vertex and primitive data to the second set of buffer locations prior to the first wavefront exporting vertex and primitive data to the first set of buffer locations (block 735). Then, when the first wavefront finishes execution, the first wavefront exports vertex and primitive data to the first set of buffer locations (block 740). After block 740, method 700 ends.

Figure 8:
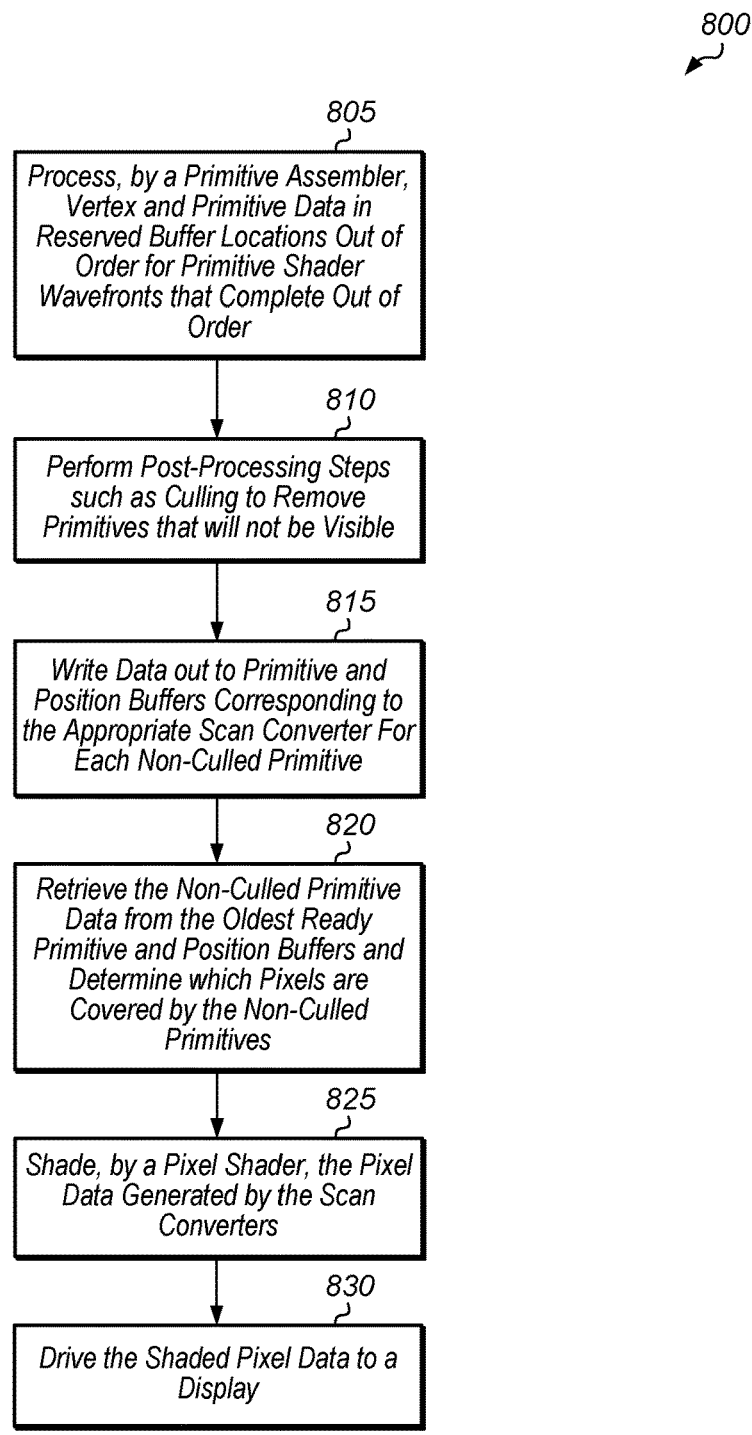
FIG. 8 is a generalized flow diagram illustrating one implementation of a method for primitive assemblers exporting data out of order and scan converters consuming data in order.

Turning now to FIG. 8, one implementation of a method 800 for primitive assemblers exporting data out of order and scan converters consuming data in order is shown. A primitive assembler processes vertex and primitive data in reserved buffer locations out of order for primitive shader wavefronts that complete out of order (block 805). For example, the primitive assembler uses the connectivity information generated by the geometry shader to connect vertices so as to reassemble the primitives. Also, the primitive assembler performs post-processing steps such as culling to remove primitives that will not be visible (block 810). For each non-culled primitive, the primitive assembler writes data out to primitive and position buffers corresponding to the appropriate scan converter (block 815). Next, each scan converter retrieves the non-culled primitive data from the oldest ready primitive and position buffers and determines which pixels are covered by the non-culled primitives (block 820). Then, a pixel shader shades the pixel data generated by the scan converters (block 825). Next, the shaded pixel data is driven to a display (block 830). After block 830, method 800 ends.

Figure 9:
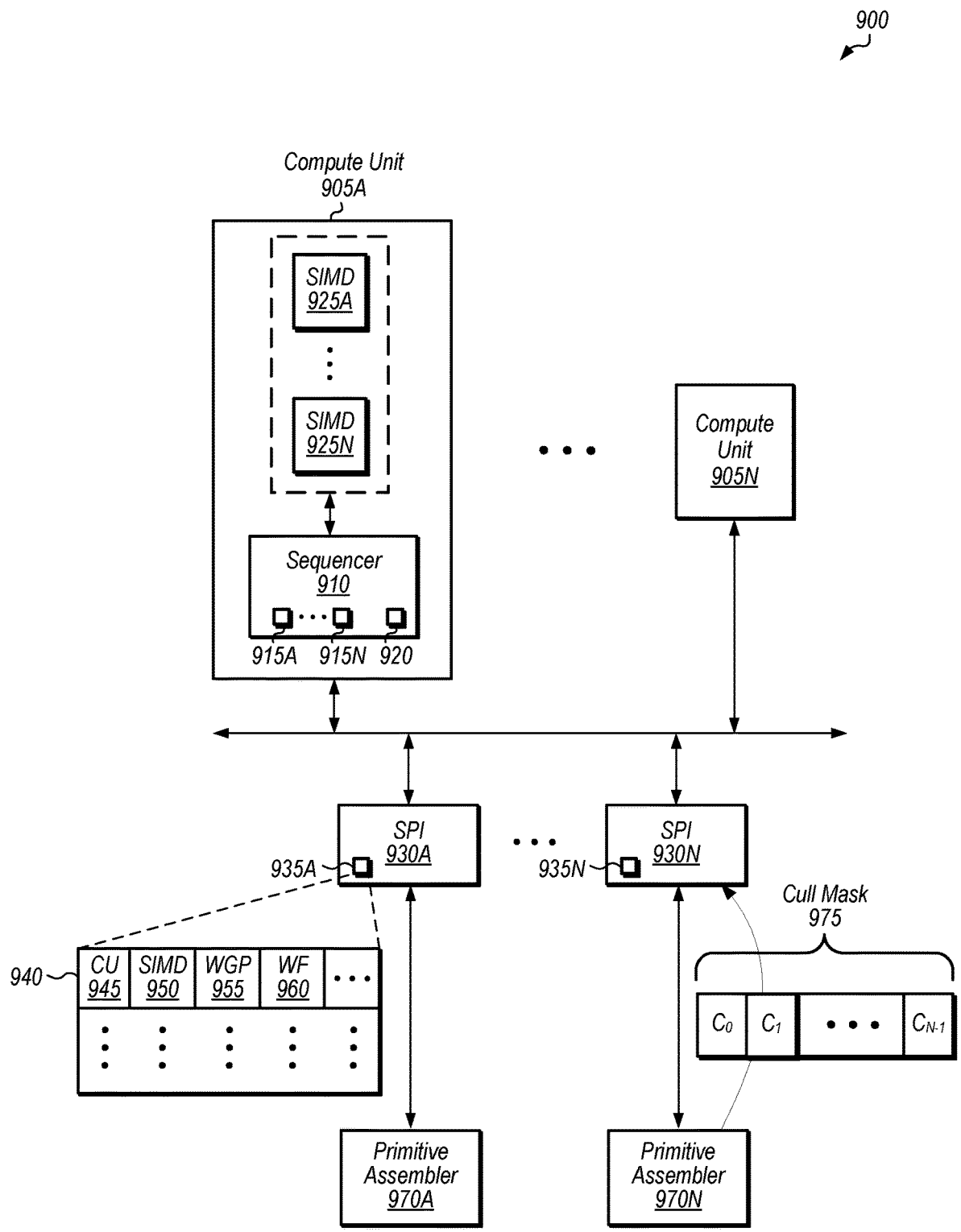
FIG. 9 is a block diagram of one implementation of a portion of a graphics processing pipeline.

Referring now to FIG. 9, a block diagram of one implementation of a portion 900 of a graphics processing pipeline is shown. Compute units 905A-N are representative of any number of compute units for executing instructions of shader programs. Compute unit 905A includes SIMD units 925A-N, which are representative of any number of SIMD units. Compute unit 905A also includes sequencer 910 for issuing sequences of instructions to SIMD units 925A-N. The other compute units, including compute unit 905N, can include similar circuitry as is shown for compute unit 905A.

In one implementation, sequencer 910 includes flags 915A-N and export counter 920. Flags 915A-N include one or more flags such as a wait-for-mask flag, end-of-inputs flag, and other flags. Export counter 920 is incremented when a given shader exports primitives or positions to a given primitive assembler 970A-N. In one implementation, export counter 920 holds a non-zero value after position and primitive export.

When a shader executing on a given compute unit 905A-N exports vertex and primitive data, the vertex and primitive data is routed from a shader processing input (SPI) 930A-N to a given primitive assembler 970A-N. The given primitive assembler 970A-N performs culling operations on the vertex and primitive data to determine which vertices will be visible to the camera. As a result of the culling operations, the given primitive assembler 970A-N generates a cull mask per wavefront and sends the cull mask back to a corresponding SPI 930A-N. For example, as shown in FIG. 9, primitive assembler 970N is sending cull mask 975 back to SPI 930N, with cull mask 975 including N bits which are labeled $C_0$ through $C_{N-1}$. The number "N" of bits of cull mask 975 matches the width of a wavefront, in terms of work-items, in one implementation. Each of the N bits represents the culling result for a corresponding vertex.

In response to receiving a cull mask, the SPI 930A-N will use a corresponding mapping table 935A-N to map the cull mask to the appropriate wavefront, workgroup, SIMD, compute unit, and so on. Mapping table 935A is expanded to show an example of a mapping table in accordance with one implementation. Entry 940 of mapping table 935A includes a compute unit 945 field, SIMD field 950, workgroup field 955, wavefront field 960, and any number of other fields. Table 935A can include any number of entries for tracking exported wavefronts that are still pending. The given SPI 930A-N will determine the compute unit 905A-N to send the cull mask to based on the appropriate entry in mapping table 935A-N. The compute unit 905A-N will receive the cull mask and discard the culled vertices which are indicated by bits of the cull mask. For example, in one implementation, a "1" cull mask bit indicates the corresponding vertex will be visible and a "0" cull mask bit indicates the corresponding vertex should be culled.

Figure 10:
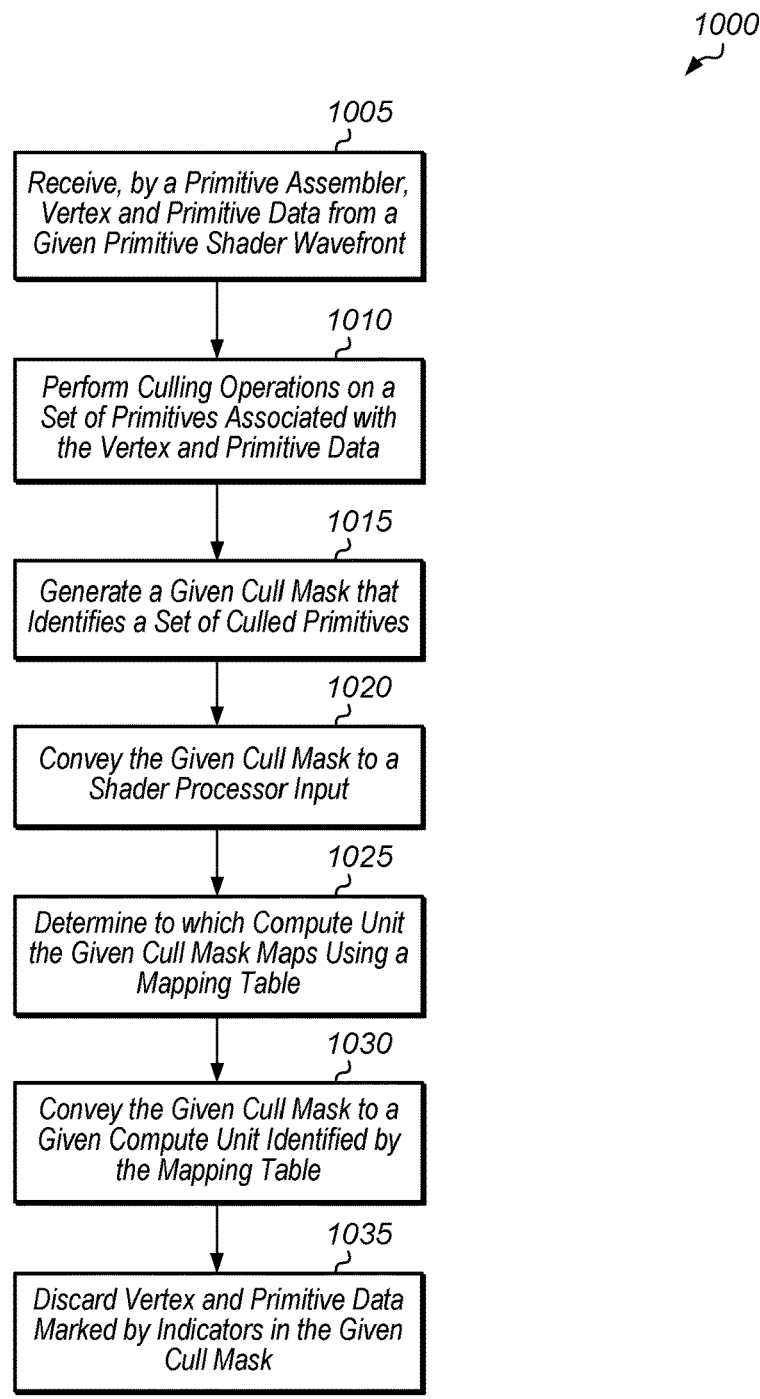
FIG. 10 is a generalized flow diagram illustrating one implementation of a method for generating a cull mask by a primitive assembler.

Turning now to FIG. 10, one implementation of a method 1000 for generating a cull mask by a primitive assembler is shown. A primitive assembler (e.g., primitive assembler 970A of FIG. 9) receives vertex and primitive data exported by a given primitive shader wavefront (block 1005). The primitive assembler performs culling operations (e.g., view culling, back-face culling, frustrum culling) on a set of primitives associated with the vertex and primitive data (block 1010). As a result of performing the culling operations, the primitive assembler generates a given cull mask that identifies a set of culled primitives (block 1015).

Next, the primitive assembler conveys the given cull mask to a shader processor input (SPI) (e.g., SPI 930A) (block 1020). Then, the SPI determines to which compute unit the given cull mask maps using a mapping table (e.g., mapping table 935A) (block 1025). In some implementations, the SPI also determines to which SIMD unit, to which wavefront, to which workgroup, and/or to one or more other entities the given cull mask maps using the mapping table. Next, the SPI conveys the given cull mask to a given compute unit identified by the mapping table (block 1030). In one implementation, the SPI also conveys, to the given compute unit, an indication identifying a given SIMD to which the given cull mask applies. Then, the given compute unit discards vertex and primitive data marked by indicators in the given cull mask (block 1035). After block 1035, method 1000 ends.

Figure 11:
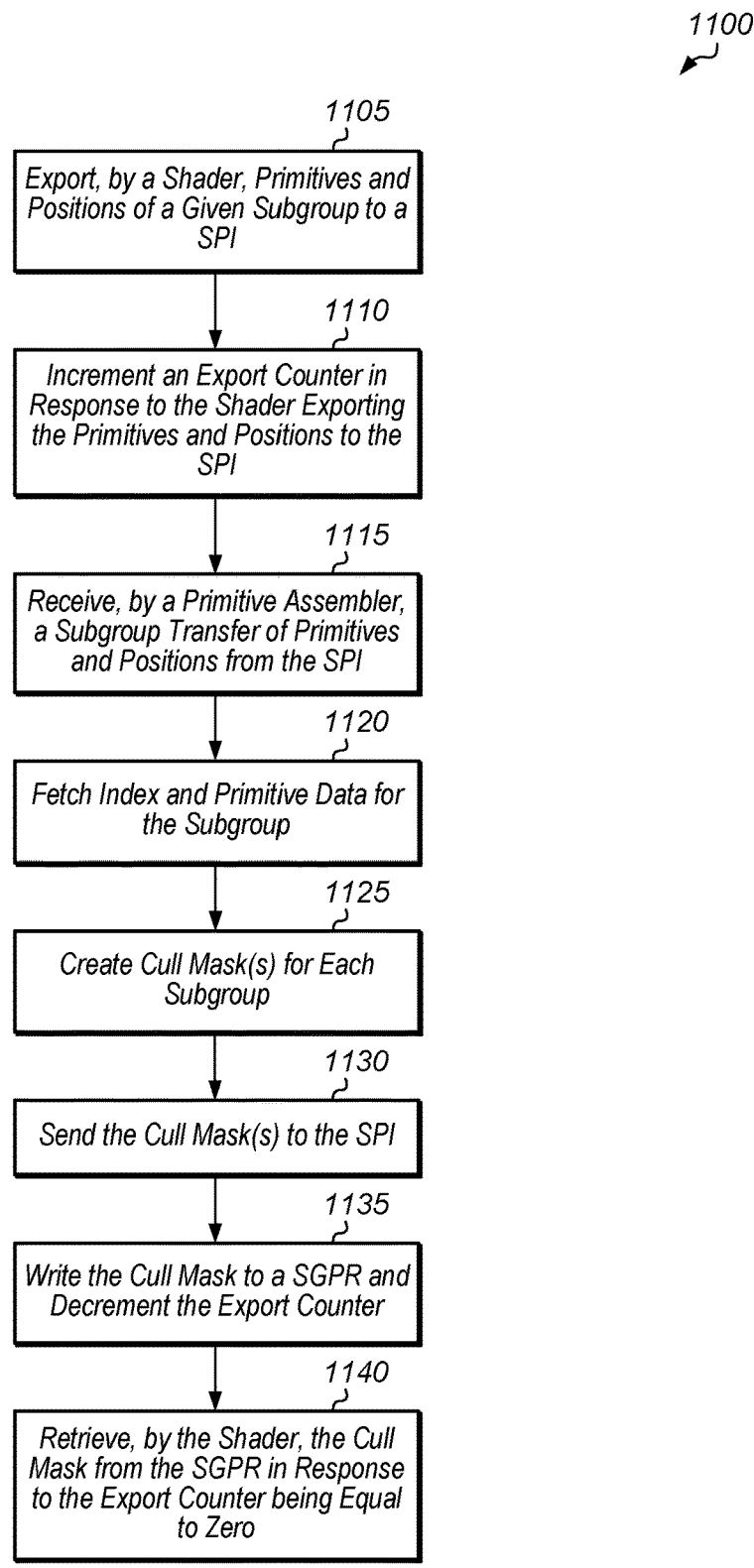
FIG. 11 is a generalized flow diagram illustrating one implementation of a method for providing culling results from a primitive assembler to a shader.

Referring now to FIG. 11, one implementation of a method 1100 for providing culling results from a primitive assembler to a shader is shown. A shader (e.g., primitive shader 425A of FIG. 4) exports primitives and positions of a given subgroup to a shader processor input (SPI) (e.g., SPI 420A) (block 1105). An export counter (e.g., export counter 920 of FIG. 9) is incremented in response to the shader exporting the primitives and positions to the SPI (block 1110). In one implementation, primitives are exported before positions while in another implementation, positions are exported before primitives. The size of a subgroup can vary according to the implementation. In one implementation, a subgroup corresponds to a specific number of wavefronts. In another implementation, a subgroup corresponds to a specific number of primitives and/or positions. In other implementations, the size of a subgroup is dependent on one or more other types of parameters.

A primitive assembler receives a subgroup transfer of primitives and positions from the SPI (block 1115). Next, the primitive assembler fetches index and primitive data for the subgroup (block 1120). Then, the primitive assembler creates cull mask(s) for each subgroup (block 1125). Next, the primitive assembler sends the cull mask(s) to the SPI (block 1130). Then, the SPI writes the cull mask to a scalar general purpose register (SGPR) and decrements the export counter (block 1135). In response to the export counter being equal to zero, the shader retrieves the cull mask from the SGPR (block 1140). After block 1140, method 1100 ends. It is noted that method 1100 can be performed on a per-subgroup basis.

Figure 12:
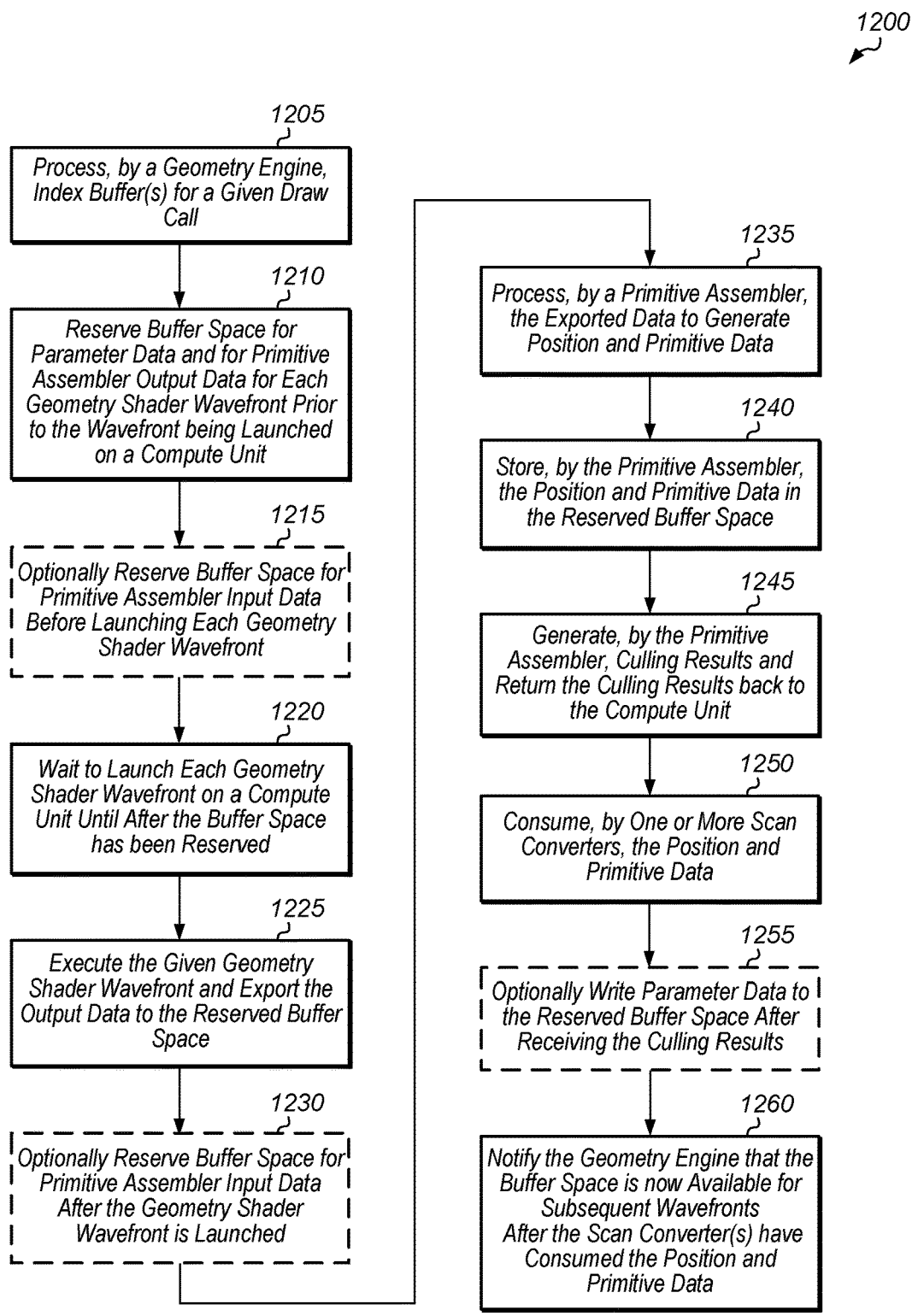
FIG. 12 is a generalized flow diagram illustrating one implementation of a method for reserving buffer space for geometry shader wavefronts.

Turning now to FIG. 12, one implementation of a method 1200 for reserving buffer space for geometry shader wavefronts is shown. A geometry engine processes index buffer(s) for a given draw call (block 1205). Next, the geometry engine reserves buffer space for parameter data and for primitive assembler output data for each geometry shader wavefront prior to the geometry shader wavefront being launched on a compute unit (block 1210). In one implementation, the geometry engine allocates the same amount of space for each geometry shader wavefront. In this way, geometry shader wavefronts can be launched in parallel up to the total amount of buffer space, and each wavefront knows where to write its output data. The primitive assembler output data refers to data generated by the primitive assembler and written to buffers to be consumed by one or more scan converters. In one implementation, the primitive assembler output data includes position and primitive data. The geometry engine optionally reserves buffer space for primitive assembler input data before launching each geometry shader wavefront (block 1215). The primitive assembler input data refers to the data generated by the geometry shader wavefront for export to the primitive assembler. Meanwhile, a SPI waits to launch each geometry shader wavefront on a compute unit until after the buffer space has been reserved for the wavefront (block 1220). By waiting to launch each wavefront until the space has been reserved for the wavefront in the buffers, this ensures that the wavefront will not be stalled due to lack of buffer space for its output data.

Next, the compute unit executes the given geometry shader wavefront and exports the output data to the reserved buffer space (block 1225). In one implementation, the output data exported by the geometry shader wavefront includes parameter data. As used herein, the term "parameter data" refers to non-position attributes associated with vertices. This is in contrast to the term "position data" which refers to the coordinates of the vertices. The "primitive data" typically refers to the connectivity information regarding how the vertices connect together to form primitives. In another implementation, the geometry shader wavefront waits to export the parameter data until culling results have been returned from the primitive assembler. The buffer space for the primitive assembler input data is optionally reserved after the geometry shader wavefront is launched in cases when this buffer space was not reserved pre-launch (block 1230).

Next, the exported data is processed by a primitive assembler to generate position and primitive data (block 1235). Then, the primitive assembler stores the position and primitive data in the reserved buffer space (block 1240). In one implementation, the primitive assembler compresses the position and primitive data prior to storing the position and primitive data in the reserved buffer space. In one implementation, the compressed position and primitive data is the unmodified input data in world space that was originally received by the primitive assembler. In another implementation, the primitive assembler compresses screen space versions of the position and primitive data to generate the compressed position and primitive data that is stored in the reserved buffer space. The type of compression used to compress the screen-space position and primitive data can vary according to the implementation. Also, the primitive assembler generates culling results and returns the culling results back to the compute unit (block 1245). Next, the position and primitive data is consumed by one or more scan converters (block 1250). Also, the compute unit optionally writes parameter data to the reserved buffer space after receiving the culling results (block 1255). While block 1255 is shown as occurring after block 1250, it is noted that in some implementations, blocks 1250 and 1255 are performed in parallel. Depending on the implementation, the parameter data is written to the reserved buffer space with the exported position and primitive data, or the parameter data is written after the culling results are fed back from the primitive assembler to the compute unit. After the scan converter(s) have consumed the position and primitive data, the geometry engine is notified that the buffer space is now available for subsequent wavefronts (block 1260). After block 1260, method 1200 ends. It is noted that while method 1200 is described in the context of geometry shader wavefronts, method 1200 can also be performed for other types of shader waveforms in other implementations.

Figure 13:
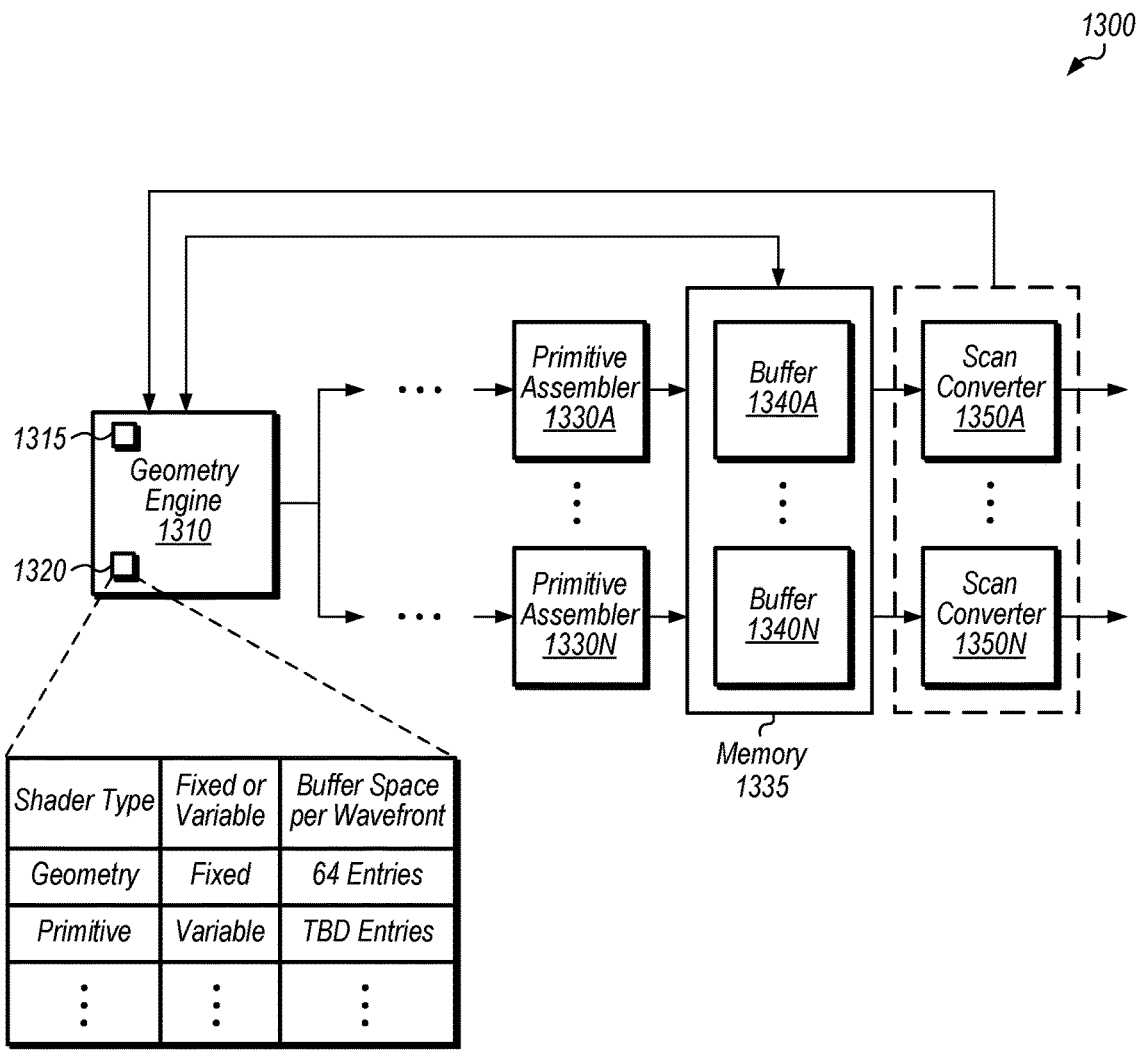
FIG. 13 is a block diagram of one implementation of a portion of a graphics processing pipeline.

Referring now to FIG. 13, a block diagram of one implementation of a portion 1300 of a graphics processing pipeline is shown. The graphics processing pipeline portion 1300 includes geometry engine 1310 for reserving buffer space in memory 1335 for shader wavefronts being launched. In one implementation, geometry engine 1310 includes at least control unit 1315 and table 1320. Geometry engine 1310 can also include other circuitry and/or other components which are not shown to avoid obscuring the figure. In one implementation, when launching shader wavefronts, control unit 1315 accesses table 1320 for determining how much buffer space to allocate for the outputs generated based on these shader wavefronts.

Table 1320 is expanded to show one example of a buffer space per wavefront table usable by geometry engine 1310. In one implementation, table 1320 stores an amount of buffer space to allocate per wavefront for compute unit output and/or primitive assembler output which is dependent on the shader type being launched. In one implementation, table 1320 is programmable by software. In some cases, the amount of buffer space for a given type of shader wavefront is predetermined and programmed into table 1320 by software. As shown in the expanded version of table 1320, a geometry shader wavefront has a fixed amount of buffer space which is allocated in memory 1335 when the geometry shader wavefront is processed by a given primitive assembler 1330A-N. In this example, the fixed amount of buffer space per geometry shader wavefront is 64 entries. However, in other implementations, geometry engine 1310 can allocate other amounts of buffer space for each geometry shader wavefront. Since the amount of buffer space to be allocated per geometry shader wavefront is fixed, control unit 1315 does not have to calculate an amount to allocate when forwarding a geometry shader wavefront to a SPI (not shown) to be launched on a given compute unit (not shown). Rather, control unit 1315 can access table 1320 and retrieve an indication of the amount of buffer space to be allocated. In contrast, for a primitive shader wavefront, the buffer space to be allocated when processing the primitive shader wavefront is variable. In one implementation, control unit 1315 calculates the amount of buffer space to allocate for each primitive shader wavefront based on the number of primitives and/or vertices assigned to the wavefront. While only two entries are shown in table 1320, it should be understood that table 1320 can include any number of other entries for other types of shader wavefronts that are launched by geometry engine 1310.

The primitive assemblers 1330A-N process the outputs of the launched wavefronts and write the position and primitive data to the assigned locations in buffers 1340A-N in memory 1335. Scan converters 1350A-N consume the position and primitive data written to buffers 1340A-N and then inform geometry engine 1310 that buffer locations have been freed up. This allows geometry engine 1310 to use the freed buffer locations for new reservations for new wavefronts being assembled.

Figure 14:
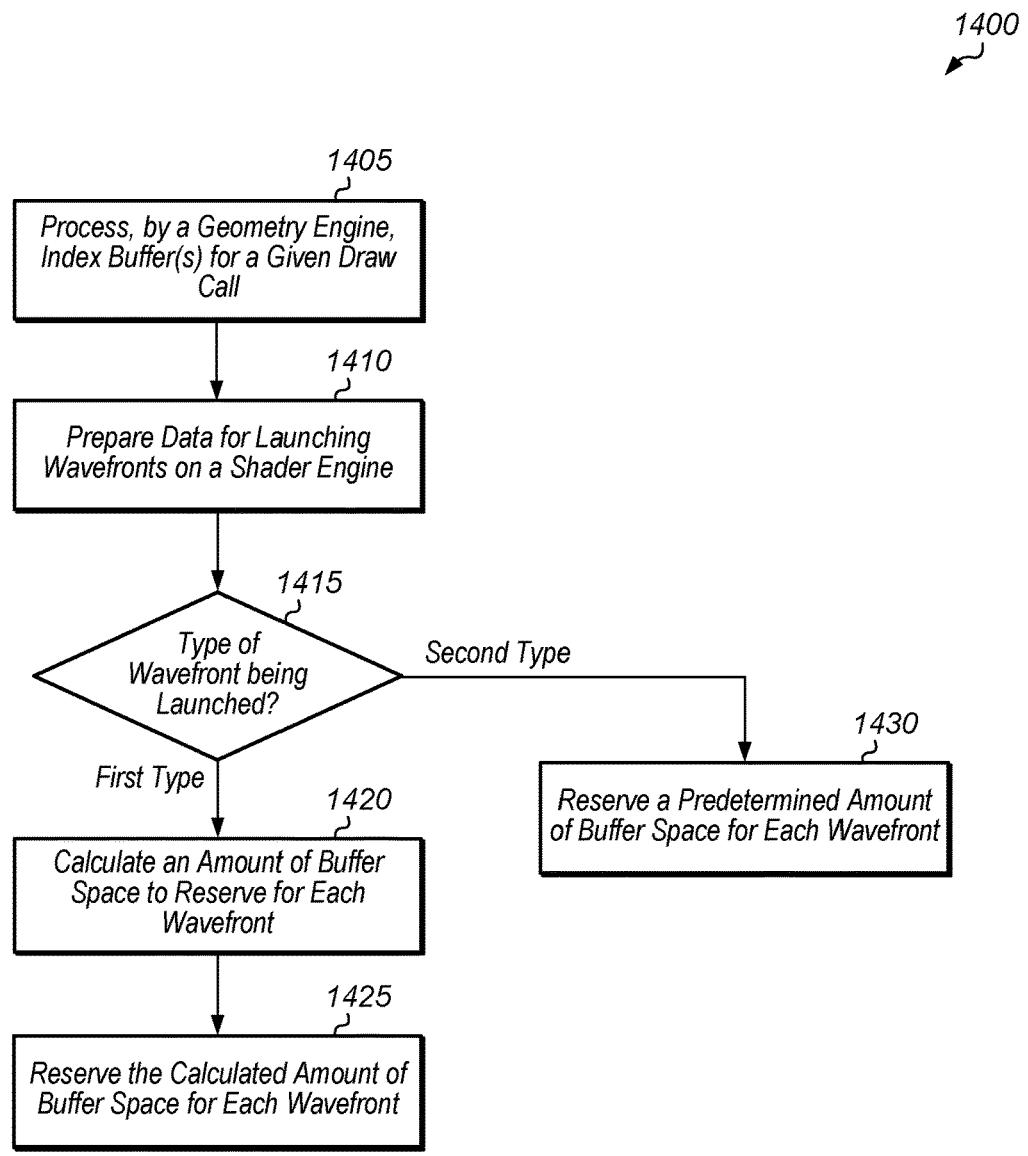
FIG. 14 is a generalized flow diagram illustrating one implementation of a method for determining an amount of buffer space to reserve per wavefront based on shader type.

Turning now to FIG. 14, one implementation of a method 1400 for determining an amount of buffer space to reserve per wavefront based on shader type is shown. A geometry engine processes index buffer(s) for a given draw call (block 1405). The geometry engine prepares data for launching wavefronts on a shader engine (block 1410). Next, if a first type of wavefront is being launched (conditional block 1415, "first type" leg), then the geometry engine calculates an amount of buffer space to reserve for each wavefront (block 1420). Next, the geometry engine reserves the calculated amount of buffer space for each wavefront (block 1425). After block 1425, method 1400 ends. In one implementation, the first type of wavefront is a primitive shader wavefront. In this implementation, the geometry engine calculates the amount of buffer space to reserve based on the number of vertices and/or primitives for each wavefront. In other implementations, the first type of wavefront refers to other types of shader wavefronts.

If a second type of wavefront is being launched (conditional block 1415, "second type" leg), then the geometry engine reserves a predetermined amount of buffer space for each wavefront (block 1430). After block 1430, method 1400 ends. In one implementation, the second type of wavefront is a geometry shader wavefront. In this implementation, the geometry engine retrieves, from a table (e.g., table 1320 of FIG. 13), an indication of the predetermined amount of buffer space to reserve for each wavefront. In other implementations, the second type of wavefront refers to other types of shader wavefronts. It is noted that the example described in method 1400 of having two different shader types is merely an example for illustrative purposes. It should be understood that a geometry engine can launch wavefronts for three or more different shader types. In these implementations, conditional block 1415 can have additional legs which are handled in the appropriate manner according to the specific shader type being launched.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
    a geometry engine comprising circuitry configured to:
        reserve, for a given shader wavefront:
            an amount of buffer space based on a number of vertices and primitives of the given shader wavefront, responsive to the given shader wavefront corresponding to a first type of shader wavefront; and
            a predetermined amount of buffer space, responsive to the given shader wavefront corresponding to a second type of shader wavefront; and
    a plurality of compute units comprising circuitry configured to execute the given shader wavefront to export vertex and primitive data to the buffer space.

2. The apparatus as recited in claim 1, further comprising: a primitive assembler configured to:
- receive vertex and primitive data from the given shader wavefront;
- perform culling operations on a set of primitives associated with the vertex and primitive data; and
- generate a given cull mask that identifies a set of culled primitive.

3. The apparatus as recited in claim 2, further comprising: a shader processor input configured to:
- receive the given cull mask from the primitive assembler;
- identify a given compute unit, of the plurality of compute units, to which the given cull mask maps; and
- convey the given cull mask to the given compute unit;
- wherein the given compute unit is configured to discard vertex and primitive data marked by indicators in the given cull mask.

4. The apparatus as recited in claim 3, wherein the shader processor input is configured to identify the given compute unit based on an access to a mapping table.

5. The apparatus as recited in claim 1, wherein the geometry engine is further configured to accumulate vertices and primitives into primitive groups, for shader wavefronts being launched.

6. The apparatus as recited in claim 1, wherein the apparatus is further configured to:
- map a given primitive group to a shader wavefront of a plurality of shader wavefronts.

7. The apparatus as recited in claim 1, wherein an amount of the buffer space reserved varies based on at least one of a number of vertices or primitives for each wavefront.

8. A method comprising:
reserving for a given shader wavefront, by circuitry:
- an amount of buffer space based on a number of vertices and primitives of the given shader wavefront, responsive to the given shader wavefront corresponding to a first type of shader wavefront;
- a predetermined amount of buffer space, responsive to the given shader wavefront corresponding to a second type of shader wavefront; and
executing, by circuitry of a compute unit, the given shader wavefront to export pre-culled vertex and primitive data to a first portion of the buffer space.

9. The method as recited in claim 8, wherein a first portion of reserved buffer space is on a first semiconductor die, and a second portion of the reserved buffer space is on a second semiconductor die different from the first semiconductor die.

10. The method as recited in claim 9, further comprising reading in order, by a scan converter, post-culled vertex and primitive data generated by a primitive assembler.

11. The method as recited in claim 10, further comprising conveying, by the scan converter to circuitry of a geometry engine, indications when the buffer space has been freed for use by subsequent shader wavefronts.

12. The method as recited in claim 10, further comprising conveying, from circuitry of a geometry engine to the primitive assembler, indications of specific buffer spaces to be used by the given shader wavefront.

13. The method as recited in claim 8, further comprising a shader processor input waiting until the buffer spaces have been reserved for the vertex and primitive data of the given shader wavefront prior to launching the given shader wavefront on the compute unit.

14. The method as recited in claim 13, wherein the pre-culled vertex and primitive data comprises parameters, positions, and connectivity data.

15. A system comprising:
a memory; and
a processor comprising circuitry configured to:
reserve, for a given shader wavefront:
- an amount of buffer space based on a number of vertices and primitives of the given shader wavefront, responsive to the given shader wavefront corresponding to a first type of shader wavefront; and
- reserve a predetermined amount of buffer space, responsive to the given shader wavefront corresponding to a second type of shader wavefront; and
execute the given shader wavefront to export vertex and primitive data to respective reserved buffer spaces, so as to render pixels for display.

16. The system as recited in claim 15, wherein the processor is further configured to perform culling of the vertex and primitive data out of order from the reserved space in the memory for shader wavefronts that complete out of order.

17. The system as recited in claim 16, wherein the processor is further configured to read post-culled vertex and primitive data in order.

18. The system as recited in claim 15, wherein the vertex and primitive data comprises parameters, positions, and connectivity data.

19. The system as recited in claim 15, wherein the processor is further configured to wait until space in the memory has been reserved for the given shader wavefront prior to launching the given shader wavefront on a compute unit.

20. The system as recited in claim 19, wherein the processor is further configured to:
map a given primitive group to the given shader wavefront.

* * * * *